(12) United States Patent
Goel et al.

(10) Patent No.: US 8,108,551 B1
(45) Date of Patent: Jan. 31, 2012

(54) SYSTEMS AND METHODS FOR MONITORING PHYSICAL PATHS WITHIN A COMPUTER NETWORK

(75) Inventors: Rajat Goel, Maharashtra (IN); Meena Patel, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 44 days.

(21) Appl. No.: 12/559,645

(22) Filed: Sep. 15, 2009

(51) Int. Cl.
*G06F 15/173* (2006.01)

(52) U.S. Cl. ...................................................... 709/242

(58) Field of Classification Search .......... 709/202–203, 709/217–229, 237, 238, 242, 245–246, 248
See application file for complete search history.

(56) References Cited

U.S. PATENT DOCUMENTS

| | | | |
|---|---|---|---|
| 7,349,960 B1* | 3/2008 | Pothier et al. ................. | 709/224 |
| 7,421,510 B2* | 9/2008 | Padmanabhan et al. ...... | 709/235 |
| 7,584,298 B2* | 9/2009 | Klinker et al. ................ | 709/238 |
| 7,599,283 B1* | 10/2009 | Varier et al. .................. | 370/216 |
| 7,684,321 B2* | 3/2010 | Muirhead et al. ............. | 370/230 |
| 7,937,472 B2* | 5/2011 | Briscoe et al. ................ | 709/226 |
| 7,974,219 B2* | 7/2011 | Strahan et al. ................ | 370/254 |
| 2003/0088671 A1* | 5/2003 | Klinker et al. ................ | 709/225 |
| 2004/0044759 A1* | 3/2004 | Padmanabhan et al. ...... | 709/223 |
| 2005/0198247 A1* | 9/2005 | Perry et al. ................... | 709/223 |
| 2008/0052387 A1* | 2/2008 | Heinz et al. ................... | 709/223 |
| 2008/0052394 A1* | 2/2008 | Bugenhagen et al. ........ | 709/224 |
| 2008/0052401 A1* | 2/2008 | Bugenhagen et al. ........ | 709/227 |
| 2008/0091766 A1* | 4/2008 | Briscoe et al. ................ | 709/202 |
| 2008/0288671 A1* | 11/2008 | Masuda .......................... | 710/38 |
| 2010/0077067 A1* | 3/2010 | Strole ............................ | 709/223 |
| 2010/0095167 A1* | 4/2010 | Kotrla et al. .................. | 714/705 |

OTHER PUBLICATIONS

Wong, Brian; "Storage Area Networks a Blueprint for Early Deployment;" Sun BluePrints; OnLine Jan. 2001; http://www.sun.com/blueprints/0101/Storage.pdf.

"White Paper: Using NetWisdom in Multi-tiered Storage Area Networks to Diagnose and Prevent SAN Performance Problems;" Finisar; accessed on Jul. 27, 2009. http://www.exanovis.ch/san/sanmon/netwisdom_whitepaper.pdf.

Luckie, Matthew et al.; "Tracerout Probe Method and Forward IP Path Interference;" Proceedings of the 8th ACM SIGCOMM; 2008; pp. 311-324; ACM; New York, NY USA.

Fraiwan, M.; "Link stress reduction in topology-aware overlay path monitoring;" Computer Communications; Jun. 25, 2008; pp. 2086-2093; vol. 31, Issue 10; Elsevier B.V.

(Continued)

*Primary Examiner* — Asad Nawaz
(74) *Attorney, Agent, or Firm* — Advantedge Law Group (57) ABSTRACT

A computer-implemented method for monitoring physical paths within a computer network may include: 1) identifying a first logical path within a computer network, 2) identifying a physical path that corresponds to the first logical path, 3) probing the physical path to determine whether the first logical path is active, 4) identifying a second logical path within the computer network, 5) determining that the physical path also corresponds to the second logical path, and then 6) using the results of the probe of the physical path to determine whether the second logical path is active without probing the physical path a second time. Additional computer-implemented methods for monitoring physical paths within multi-host computer networks are also disclosed.

20 Claims, 7 Drawing Sheets

OTHER PUBLICATIONS

Rexford, Jennifer; Multipath Routing; Princeton; accessed on Jul. 27, 2009; http://www.cs.princeton.edu/courses/archive/fall08/cos561/slides/10Multipath.ppt.

Chung, Wonzoo et al.; "Fast Recovery Blind Equalization for Time-Varying Channels Using "Run-and-Go" Approach;" IEEE Transactions on Broadcasting; Sep. 2007; pp. 693-696.

vol. 53, Iss. 3; http://ieeexplore.ieee.org/Xplore/login.jsp?url=http%3A%2F%2Fieeexplore.ieee.org%2Fiel5%2F11%2F4292327%2F04292331.pdf%3Farnumber%3D429231&authDecision=-203.

Bisnath, Sunil B. et al.; "Pseudorange Multipath Mitigation by Means of Multipath Monitoring and De-Weighting;" accessed on Jul. 27, 2009.
http://gauss.gge.unb.ca/papers.pdf/kis01.bisnath.pdf.

\* cited by examiner

SYSTEMS AND METHODS FOR MONITORING PHYSICAL PATHS WITHIN A COMPUTER NETWORK

BACKGROUND

Computer networks may experience communication failures that prevent access to certain network devices. For example, in a storage area network, a host may lose communication with one or more storage devices. To overcome such communication failures, computer networks may implement multipathing techniques to identify the physical path(s) where such failures occurred and then establish communication through one or more different physical paths. However, multipathing techniques may waste valuable time and resources by probing the same physical path more than once.

For example, conventional multipathing techniques may use logical paths to provide a layer of abstraction and to identify physical paths within computer networks. However, because multiple logical paths may correspond to the same physical path, conventional multipathing techniques may redundantly and unnecessarily probe the same physical path more than once. As such, the instant disclosure identifies a need for a multipathing technique that eliminates redundancy by monitoring physical paths within a computer network.

SUMMARY

As will be described in greater detail below, the instant disclosure generally relates to systems and methods for monitoring physical paths within a computer network. In particular, the systems and methods disclosed herein may provide a multipathing technique that eliminates redundancy by monitoring physical paths, rather than logical paths, within a computer network (e.g., a storage area network).

For example, a method for monitoring physical paths within a computer network may include: 1) identifying a first logical path within a computer network, 2) identifying a physical path that corresponds to the first logical path, 3) probing the physical path to determine whether the first logical path is active, 4) identifying a second logical path within the computer network, 5) determining that the physical path also corresponds to the second logical path, and then 6) using the results of the probe of the physical path to determine whether the second logical path is active without probing the physical path a second time. In at least one embodiment, a host (e.g., a server) in a computer network may perform this exemplary method to monitor the health of physical paths within the computer network.

In certain embodiments, the first logical path may identify a physical path that facilitates communication between a host and a network device. The physical path may include one or more communication ports within the computer network. In this example, the host may probe the physical path to determine whether the communication ports in the physical path are active (i.e., healthy). If each communication port in the physical path is active, the host may determine that the first logical path is active.

To probe the physical path, the host may attempt to access a network device through the physical path. If the host successfully accesses the network device through the physical path, the host may determine that each communication port in the physical path is active. However, if the host is unable to access the network device through the physical path, the host may determine that at least one communication port in the physical path is inactive (i.e., unhealthy).

In some embodiments, the host may create an active-port list that identifies which communication ports are active. For example, upon successfully accessing a network device through the physical path, the host may add each communication port in the physical path to an active-port list. The active-port list may allow the host to determine whether a second logical path is active without probing the physical path again.

A second, different logical path may also identify the physical path (i.e., the same physical path that is associated with the first logical path). To avoid probing the physical path more than once, the host may compare each communication port in the physical path with the active-port list. If the active-port list includes each communication port in the physical path, the host may determine that the second logical path is active without probing the physical path again.

In at least one embodiment, the host may create a probed-path list that identifies which physical paths within the computer network have been probed. Upon probing the physical path, the host may add the physical path to the probed-path list. The probed-path list, in conjunction with the active-port list, may allow the host to determine whether the second logical path is inactive without probing the physical path. For example, the host may determine that the active-port list does not include each communication port in the physical path corresponding to the second logical path but that the probed-path list does include the physical path corresponding to the second logical path. As a result, the host may determine that the second logical path is inactive.

The systems and methods disclosed herein may also be used to monitor physical paths within a multiple-host computer network. In one example, a method for performing such a task may include: 1) identifying, at a first host in the computer network, a first logical path within the computer network, 2) identifying a first physical path that corresponds to the first logical path, 3) probing the first physical path to determine whether the first logical path is active, 4) providing at least a portion of the results of the probe of the first physical path to a second host in the computer network, 5) identifying, at the second host, a second logical path within the computer network, 6) identifying a second physical path that corresponds to the second logical path, and then 7) using the results of the probe of the first physical path to determine whether the second logical path is active without probing the second physical path. In certain embodiments, a plurality of hosts (e.g., a plurality of servers) in a computer network may collectively perform this exemplary method to monitor the health of physical paths within the computer network.

In at least one example, the first host may only have access to certain physical paths and, as such, only certain communication ports within the computer network. In this example, the first host may create an active-port list that identifies which communication ports are both active and accessible to the first host. The first host may then identify and probe a first physical path corresponding to a first logical path. After successfully gaining access to a network device through the first physical path, the first host may create and/or populate an active-port list with each communication port in the first physical path. The active-port list may allow a second host to determine whether a second logical path is active without probing a second physical path that corresponds to the second logical path.

For example, the first host may transmit the active-port list to a managing host in the computer network. The managing host may then identify at least a portion of the active-port list that includes communication ports accessible to a second host in the computer network. Subsequently, the managing host may transmit all or a the portion of the active-port list to the second host. The second host may then identify a second physical path that corresponds to a second logical path and, based on the active-port list, determine whether the second logical path is active without probing the second physical path.

In one example, one or more of the exemplary methods described herein may be embodied as computer-readable instructions in a computer-readable medium. For example, a computer-readable medium may include computer-executable instructions that, when executed by at least one processor of a computing device, may cause the computing device to: 1) identify a first logical path within a computer network, 2) identify a physical path that corresponds to the first logical path, 3) probe the physical path to determine whether the first logical path is active, 4) identify a second logical path within the computer network, 5) determine that the physical path also corresponds to the second logical path, and then 6) use the results of the probe of the physical path to determine whether the second logical path is active without probing the physical path a second time By monitoring physical paths rather than logical paths, the various systems and methods described herein may enable hosts in a computer network to quickly and accurately identify active and inactive logical paths. The various systems and methods described herein may also enable hosts to receive network topology information that they may use to quickly and accurately identify active and inactive logical paths. As a result, these systems and methods may reduce the amount of time and resources required to perform conventional multipathing techniques.

Systems and computer-readable media corresponding to the above-described methods are also disclosed. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for monitoring physical paths within a computer network. In particular, the systems and methods disclosed herein may provide a multipathing technique that eliminates redundancy by monitoring physical paths, rather than logical paths, within a computer network.

The phrase "physical path," as used herein, generally refers to any route through which one device may access another device within a computer network. For example, a host (e.g., a server) may access, or communicate with, a specific network device through a specific network switch, thereby defining a physical path from the host through the specific network switch to the specific network device. The physical path may be active or inactive depending on whether each communication port in the physical path is active or inactive.

In certain embodiments, one or more physical paths may collectively define a network topology in a computer network (e.g., a storage area network topology). Physical paths may include any transmission media, whether physical or wireless, that facilitates communication within a computer network. Examples of transmission media in computer networks include, without limitation, optical fibers, Ethernet cables, wireless radios, coaxial cables, power lines, or any other suitable transmission media.

In addition, the phrase "network topology information," as used herein, generally refers to any information regarding logical paths, physical paths, and/or communication ports within a computer network. More specifically, network topology information may indicate whether logical paths, physical paths, and/or communication ports are active. Examples of network topology information include, without limitation, an active-port list, a probed-path list, or any other suitable network topology information, as detailed below.

The phrase "computer network," as used herein, generally refers to any collection of interconnected computing devices, communication devices, and/or storage devices. For example, a storage area network may incorporate one or more hosts, network switches, and/or disk arrays. Examples of computer network include, without limitation, storage area networks (SANs), network attached storages (NASs), personal area networks (PANs), local area networks (LANs), campus area networks (CANs), metropolitan area networks (MANs), wide area networks (WANs), global area networks (GANs), virtual private networks (VPNs), cellular networks (e.g., GSM networks), internetworks, intranets, extranets, and the Internet.

The phrase "logical path," as used herein, generally refers to any data structure that identifies a physical path in a computer network. More specifically, a logical path may identify one or more path segments that define a physical path within a computer network. Examples of data structures that may identify a physical path include, without limitation, a bitmap array, a hash table, a binary tree, or any other suitable data structure.

Figure 1:
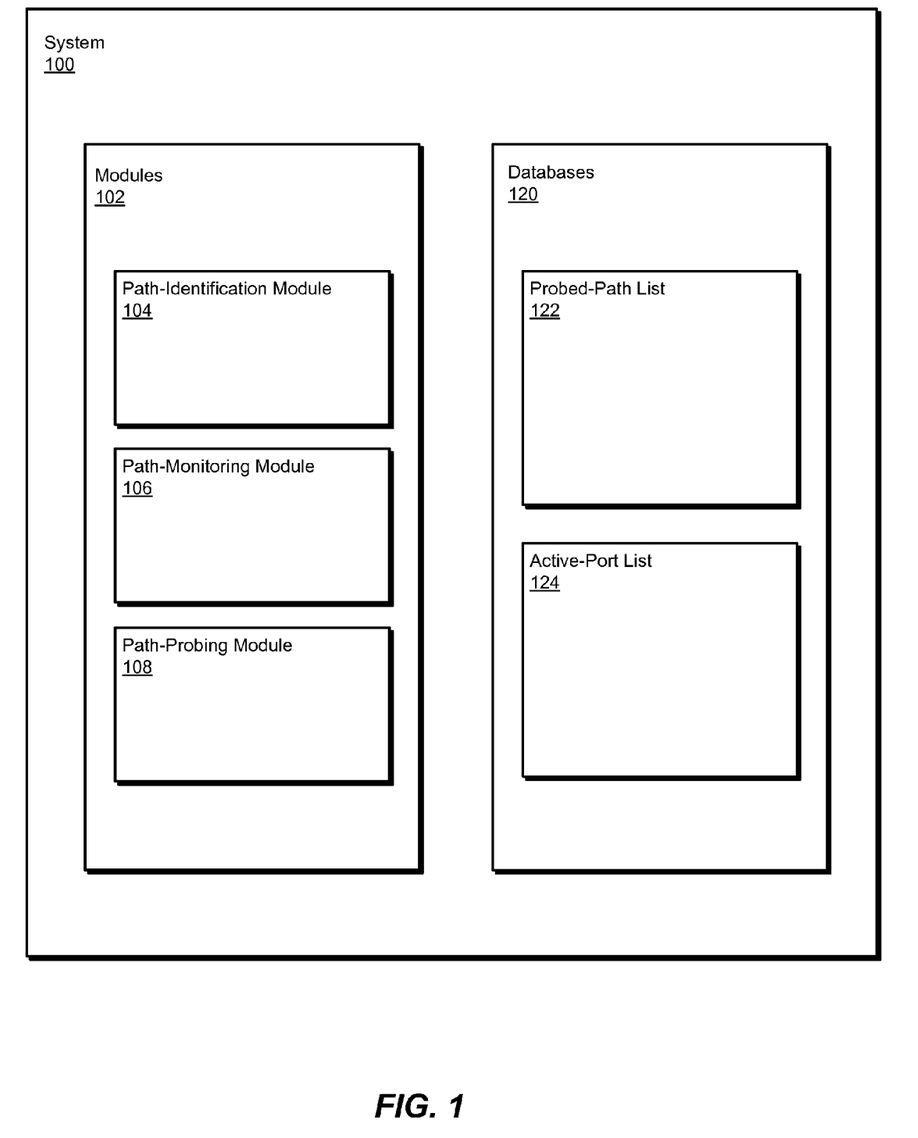
FIG. 1 is a block diagram of an exemplary system for monitoring physical paths within a computer network according to at least one embodiment.
Figure 2:
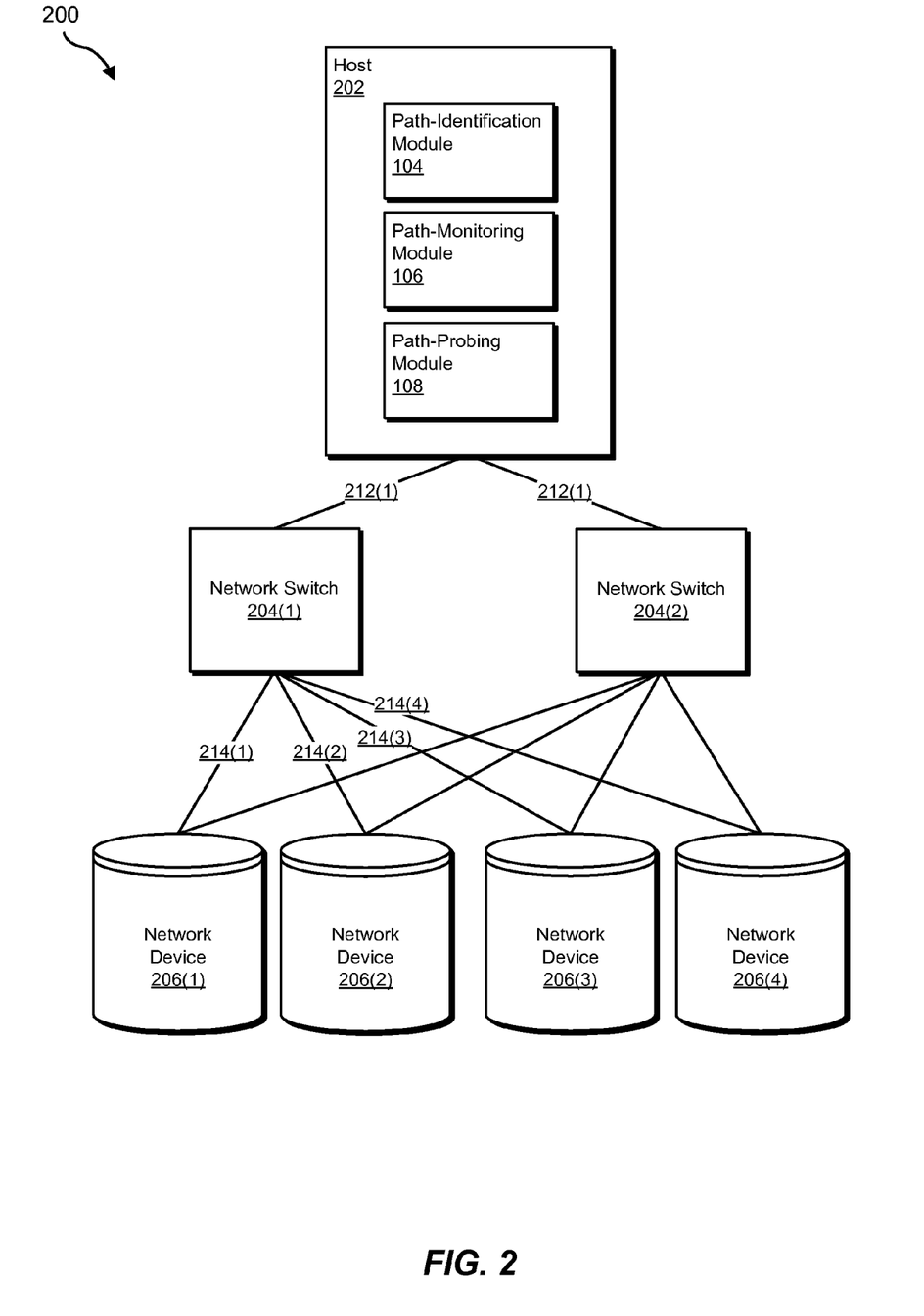
FIG. 2 is a block diagram of an exemplary system for monitoring physical paths within a computer network according to at least one embodiment.
Figure 3:
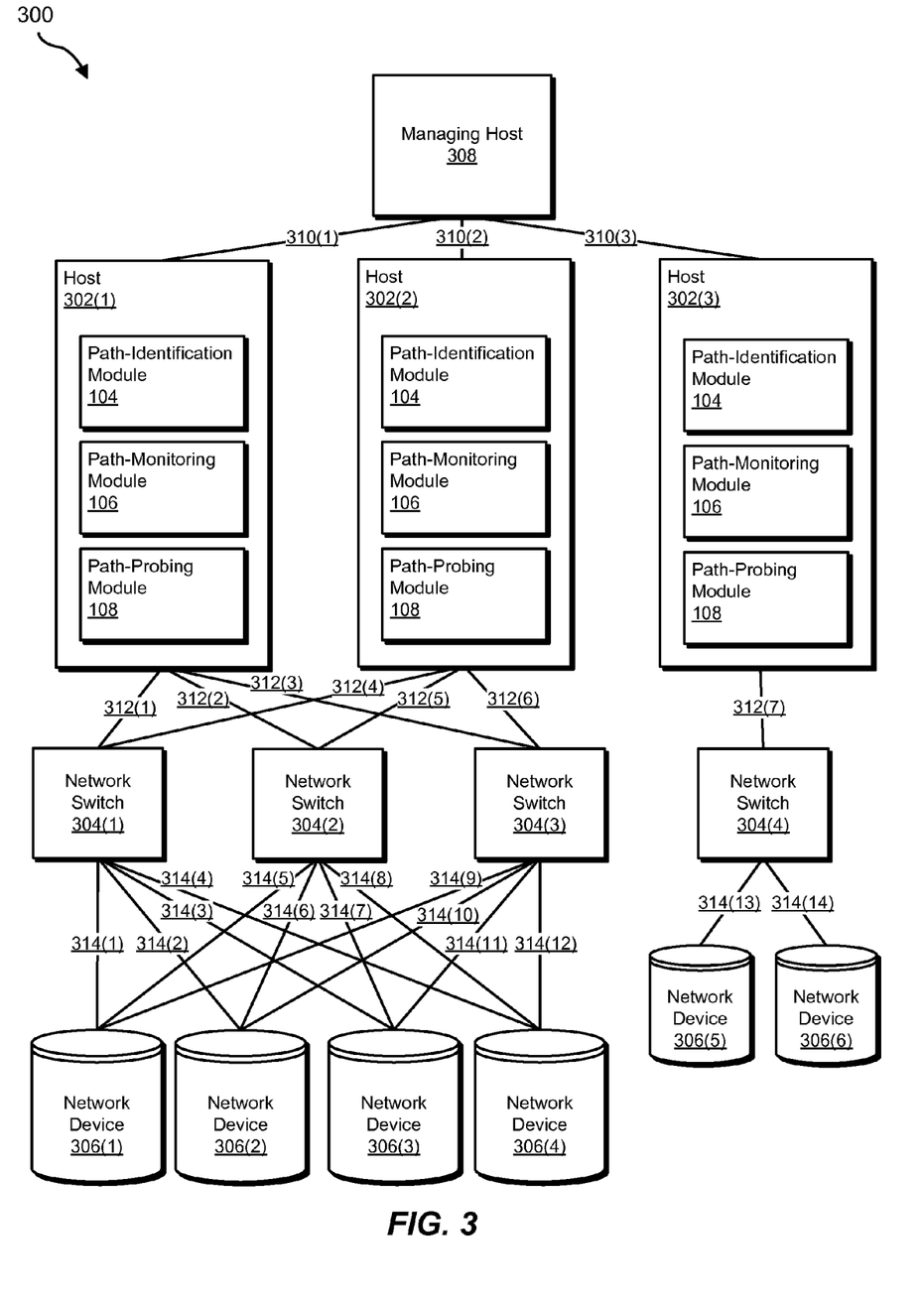
FIG. 3 is a block diagram of an exemplary system for monitoring physical paths within a computer network according to another embodiment.

The following will provide, with reference to FIGS. 1-3, detailed descriptions of exemplary systems for monitoring physical paths within a computer network. Detailed descriptions of corresponding computer-implemented methods will also be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for monitoring physical paths within a computer network. As illustrated in this figure, exemplary system 100 may include one or more modules 102 for performing one or more tasks. For example, and as will be explained in greater detail below, exemplary system 100 may include a path-identification module 104 programmed to identify logical paths and corresponding physical paths within a computer network. Exemplary system 100 may also include a path-monitoring module 106 programmed to probe physical paths to determine whether certain logical paths are active.

Furthermore, exemplary system 100 may include a path-monitoring module 108 programmed to use the results of the probes of physical paths to determine whether additional logical paths are active without probing the corresponding physical paths a second time. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., host 202 and/or network devices 206), the devices illustrated in FIG. 3 (e.g., hosts 302, network devices 306, and/or managing host 308), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a probed-path list 122 for identifying one or more physical paths within a computer network that have been probed. In addition, exemplary system 100 may include an active-port list 124 for identifying one or more communication ports within a computer network that are active. In other words, active-port list 124 may identify one or more communication ports in a physical path through which a network device has been successfully accessed.

Databases 120 in FIG. 1 may represent a portion of one or more computing devices. For example, databases 120 may represent a portion of host 202 in FIG. 2, managing host 308 and/or hosts 302 in FIG. 2, computing system 610 in FIG. 6, and/or portions of exemplary network architecture 700 in FIG. 7. Alternatively, databases 120 in FIG. 1 may represent one or more physically separate devices capable of being accessed by a computing device, such as host 202 in FIG. 2, managing host 308 and/or hosts 302 in FIG. 2, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of a cloud-computing or network-based environment, such as exemplary computer network 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, computer network 200 may include a host 202 capable of communicating with network devices 206 via network switches 204. In one embodiment, and as will be described in greater detail below, host 202 may be programmed to identify a first logical path and a corresponding physical path within a computer network and to probe the physical path to determine whether the first logical path is active. In addition, host 202 may be programmed to identify a second logical path within a computer network and to determine whether the second logical path also corresponds to the physical path. Host 202 may also be programmed to use the results of the probe of the physical path to determine whether the second logical path is active.

Hosts 202 and 302, in addition to managing host 308, generally represent any type or form of computing device capable of reading computer-executable instructions. Examples of host 202 include, without limitation, laptops, desktops, servers, cellular phones, personal digital assistants (PDAs), multimedia players, embedded systems, combinations of one or more of the same, exemplary computing system 610 in FIG. 6, or any other suitable host.

Network switches 204 and 304 generally represent any intermediary device that facilitates communication between two or more other devices within a computer network. For example, network switches 204 in FIG. 2 may facilitate communication between host 202 and network devices 206. Examples of network switches include, without limitation, network bridges, multilayer switches, network hubs, signal repeaters, packet switches, routers, or any other suitable networks switches. Although FIGS. 2 and 3 illustrate network switches 204 and 304 operating in parallel between hosts and network devices, additional network topologies may include two or more network switches operating in series.

Network devices 206 and 306 generally represent any type or form of computing or storage device that is capable of communicating with host 202 via network switches 204. For example, network devices 206 in FIG. 2 may represent storage arrays that communicate with host 202 via network switches 204. Examples of network devices 206 include, without limitation, storage arrays, disk arrays, disk array controllers, computing devices, application servers, database servers, or any other suitable network devices.

As FIGS. 2 and 3 illustrate, a computer network may include path segments that define one or more physical paths. The phrase "path segments," as used herein, generally refers to segments of a physical path that facilitates communication within a computer network. Path segments may define a physical path and facilitate communication between communication ports in the physical path. For example, path segment 212(1) may facilitate communication between host 202 and network switch 204(1), and path segment 214(1) may facilitate communication between network switch 204(1) and network device 206(1). Together, path segments 212(1) and 214(1) may define a physical path that facilitates (via network switch 204(1)) communication between host 202 and network device 206(1).

In addition, communication ports may provide communication functionality to devices within a computer network. Examples of communication ports include, without limitation, host ports, network switch ports, network device ports, network bridge ports, multilayer switch ports, network hub ports, signal repeater ports, packet switch ports, router ports, or any other suitable communication ports.

As illustrated in FIG. 3, computer network 300 may represent a computer network with additional network topology, including a plurality of hosts 302 and a managing host 308. In one embodiment, and as will be described in greater detail below, each of hosts 302 may be programmed to identify a first logical path and a first physical path within a computer network and to probe the first physical path to determine whether the first logical path is active. Managing host 308 may be programmed to provide at least a portion of the results of the physical probe to other hosts 302.

Each of hosts 302 may be programmed to identify a second logical path and a second physical path within the computer network. Each of hosts 302 may also be programmed to use the results of the probe of the first physical path to determine whether the second logical path is active. Path segments 310, 312, and 314 in FIG. 3 may facilitate communication between devices in the computer network through communication ports, such as managing host ports, host ports, network switch ports, and network device ports.

For example, path segment 310(1) may facilitate communication between managing host 308 and host 302(1), and path segment 312(1) may facilitate communication between host 302(1) and network switch 304(1). Likewise, path segment 314(1) may facilitate communication between network switch 304(1) and network switch 306(1).

As FIG. 3 illustrates, a computer network may include one or more hosts that lack access to one or more network devices. For example, host 302(1) may lack access to network devices 306(5) and 306(6), and host 302(3) may lack access to network devices 306(1)-(4). In other words, the computer network may lack a physical path that facilitates communication between various hosts and network devices and, as such, host 302(3) may be unable to access network devices 306(1)-(4), at least directly.

Figure 4:
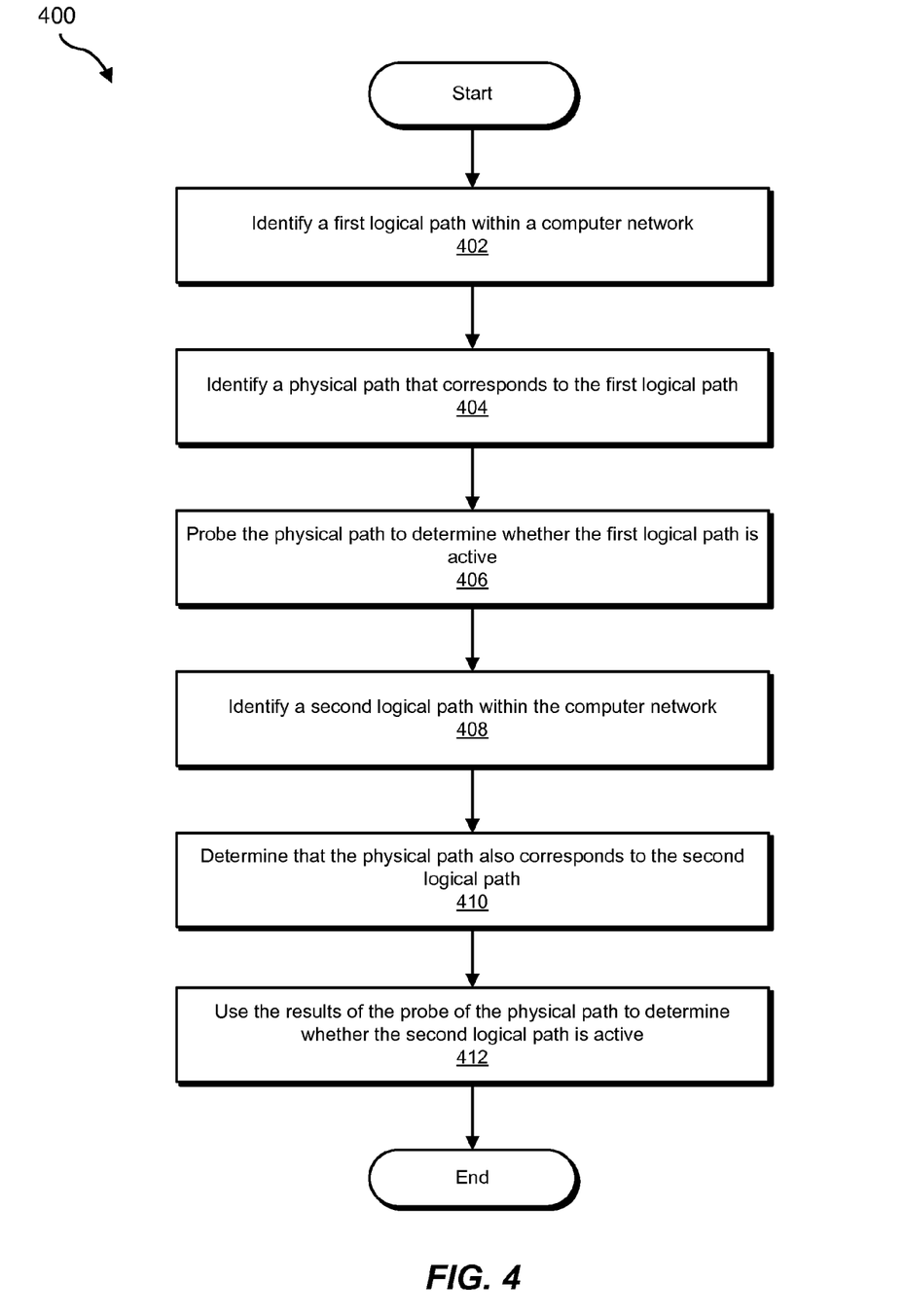
FIG. 4 is a flow diagram of an exemplary method for monitoring physical paths within a computer network according to at least one embodiment.

FIG. 4 is a flow diagram of an exemplary computer-implemented method 400 for monitoring physical paths within a computer network. The steps shown in FIG. 4 may be performed by any suitable computer-executable code and/or computing system. In some embodiments, the steps shown in FIG. 4 may be performed by one or more of the components of system 100 in FIG. 1, computer network 200 in FIG. 2, and/or computer network 300 in FIG. 3.

At step 402 in FIG. 4, one or more of the various systems described herein may identify a first logical path within a computer network. For example, path-identification module 104 may, as part of host 202 in computer network 200, identify a first logical path within computer network 200 in FIG. 2.

Step 402 may be performed in a variety of ways. For example, path-identification module 104 may create or acquire the first logical path. The first logical path may identify one or more path segments within the computer network. For example, the first logical path may identify path segments 212(1) and 214(1) within the computer network. The first logical path may include any data structure, including a bitmap array, a hash table, or a binary tree.

At step 404, the systems described herein may identify a physical path that corresponds to the first logical path. For example, path-identification module 104 may identify a physical path based on the first logical path. The first logical path may identify one or more path segments that define the physical path.

Step 404 may be performed in a variety of ways. In certain embodiments, the systems described herein may identify path segments that define the physical path. For example, path-identification module 104 may identify path segments 212(1) and 214(1) defining a physical path that is based on the first logical path. In this example, the physical path, which includes path segments 212(1) and 214(1), may facilitate communication between host 202 and network device 206(1) through network switch 204(1). In some embodiments, the physical path may be represented by a data structure, such as a bitmap array, a hash table, or a binary tree, as will be explained in greater detail below.

Each path segment in the physical path may correspond to at least two communication ports. For example, path segment 212(1) may correspond to a communication port at host 202 and a communication port at network switch 204(1). Similarly, path segment 214(1) may correspond to another communication port at network switch 204(1) and a communication port at network device 206(1). As a result, path-identification module 104 may identify each communication port in the physical path based on the path segments identified by the first logical path.

At step 406, the systems described herein may probe the physical path to determine whether the first logical path is active. For example, path-probing module 108 may probe the physical path to determine whether the first logical path is active. Path-probing module 108 may determine that the first logical path is active if each communication port in the physical path is active.

Step 406 may be performed in a variety of ways. In certain embodiments, path-probing module 108 may attempt to access a network device to determine whether the first logical path is active. For example, path-probing module 108 may, as part of host 202, attempt to access network device 206(1) to determine whether the first logical path is active. Path-probing module 108 may determine that the first logical path is active if each communication port corresponding to path segments 212(1) and 214(1) is active.

If path-probing module 108 successfully accesses network device 206(1), path-monitoring module 106 may determine that each communication port in the physical path is active and, therefore, that the first logical path is active. However, if path-probing module 108 fails to access network device 206(1), path-monitoring module 106 may determine that at least one communication port in the physical path is inactive and, therefore, that the first logical path is inactive.

In some embodiments, path-monitoring module 106 may create and/or maintain a probed-path list that identifies which physical paths within the computer network have been probed. For example, path-monitoring module 106 may create probed-path list 124 in FIG. 1. In this example, after the physical path has been probed, path-monitoring module 106 may add the physical path to probed-path list 124 by, for example, adding each communication port defining the physical path to probed-path list 124. Probed-path list 124 may represent any type or form data structure, such as, for example, a bitmap array, a hash table, or a binary tree.

In certain embodiments, path-monitoring module 106 may create and/or populate an active-port list that identifies active communication ports within the computer network. For example, path-monitoring module 106 may create active-port list 124 in FIG. 1. After the physical path has been probed, path-monitoring module 106 may add each active communication port in the physical path to active-port list 124. In other words, if path-probing module 108 successfully accesses a network device through the physical path, path-monitoring module 106 may add each communication port in the physical path to active-port list 124. This active-port list may represent any type or form of data structure, including, for example, a bitmap array, a hash table, or a binary tree.

At step 408, the systems described herein may identify a second logical path within the computer network. For example, path-identification module 104 may identify a second logical path within the computer network. In certain embodiments, path-identification module 104 may create or acquire the second logical path. The second logical path may also identify one or more path segments within the computer network. For example, the second logical path may identify path segments 212(1) and 214(1) within the computer network.

In some examples, the second logical path may be different from the first logical path. In this example, while the second logical path may be different from the first logical path, the second logical path may still identify a physical path that is identical to the physical path corresponding to the first logical path. For example, a second logical path, which is different from the first logical path, may identify path segments 212(1) and 214(1) defining a physical path. Based on path segments 212(1) and 214(1), path-identification module 104 may identify each communication port in the physical path that corresponds to the second logical path.

At step 410, the systems described herein may determine that the physical path identified in step 404 corresponds to both the first logical path identified in step 402 and the second logical path identified step 408. For example, path-identification module 104 may: 1) identify each communication port in the physical path that corresponds to the second logical path and then 2) compare each of these communication ports with probed-path list 124. Since, in this example, path-monitoring module 106 has already added the physical path to probed-path list 124, path-identification module 104 may determine that the physical path also corresponds to the second logical path.

At step 412, the systems described herein may use the results of the probe of the physical path to determine whether the second logical path is active without probing the physical path a second time. For example, path-monitoring module 106 may compare each communication port in the physical path with active-port list 124. If active-port list 124 includes each communication port in the physical path, path-monitoring module 106 may determine that the second logical path is active. However, if probed-path list 124 includes each communication port in the physical path, but active-port list 124 lacks one or more of the communication ports in the physical path, path-monitoring module 106 may determine that the second logical path is inactive. Upon completion of step 412 in FIG. 4, exemplary method 400 may terminate.

Although not illustrated in FIG. 4, exemplary method 400 may include one or more additional steps. For example, in certain embodiments the systems described herein may mark the first logical path as active upon determining that the first logical path is active. For example, path-monitoring module 106 may mark the first logical path as active if path-probing module 108 probes the physical path and successfully accesses a network device through the physical path. Path-monitoring module 106 may mark the first logical path as active with any suitable identifier, or alternatively, path-monitoring module 106 may create an active-path list and add the first logical path to the active-path list. The active-path list may identify logical paths that correspond to physical paths through which path-probing module 106 has successfully accessed network devices.

Path-monitoring module 106 may also mark the first logical path as inactive if path-probing module 108 probes the physical path but fails to access a network device through the physical path. Path-monitoring module 106 may mark the first logical device as inactive with any suitable identifier, or alternatively, path-monitoring module 106 may create an inactive-path list and add the first logical path to the inactive-path list. The inactive-path list may identify logical paths that correspond to physical paths through which path-probing module 106 has attempted but failed to access network devices.

Similarly, path-monitoring module 106 may mark the second logical path as active or inactive based on whether path-probing module 108 has successfully accessed a network device through the physical path. The active-path list and the inactive-path list may include any data structure, including a bitmap array, a hash table, or a binary tree.

For illustrative purposes only, the following will describe an exemplary method for monitoring physical paths within a network. In this example, the method may incorporate a storage area network (SAN) that implements a multipathing technique to probe a SAN topology. The SAN topology may include physical paths represented by bitmap arrays. For example, a bitmap array may identify path segments 212(1) and 214(1) in FIG. 2 as a physical path in the SAN topology.

In this example, a host in the SAN may maintain an exemplary bitmap array named "PROBE_DONE" for identifying bitmap arrays that represent physical paths that have been probed. For example, after a multipathing driver has probed path segments 212(1) and 214(1), the host may update PROBE_DONE with a bitmap array that represents path segments 212(1) and 214(1). Similarly, the host may also maintain a bitmap array named "ACTIVE_PORT_SET" for identifying communication ports in the SAN topology that are active. For example, after determining that the path segments 212(1) and 214(2) are active, the host may update ACTIVE_PORT_SET with a bitmap array that identifies each communication port in path segments 212(1) and 214(2).

Thus, to determine whether a logical path is active without probing the physical path that corresponds to the logical path, a host may compare a bitmap array that represents the physical path with ACTIVE_PORT_LIST. For example, host 202 may compare each bit of a bitmap array that represents a physical path with each bit in ACTIVE_PORT_LIST. Similarly, to determine whether a logical path corresponds to a physical path that has already been probed, the host may compare a bitmap array that represents the physical path with PROBE_DONE. For example, host 202 may compare each bit of a bitmap array that represents a physical path with each bit in PROBE_DONE.

By monitoring physical paths rather than logical paths, the various systems and methods described herein may enable hosts in a computer network to quickly and accurately identify active and inactive logical paths. As a result, these systems and methods may reduce the amount of time and resources required to perform conventional multipathing techniques.

Figure 5:
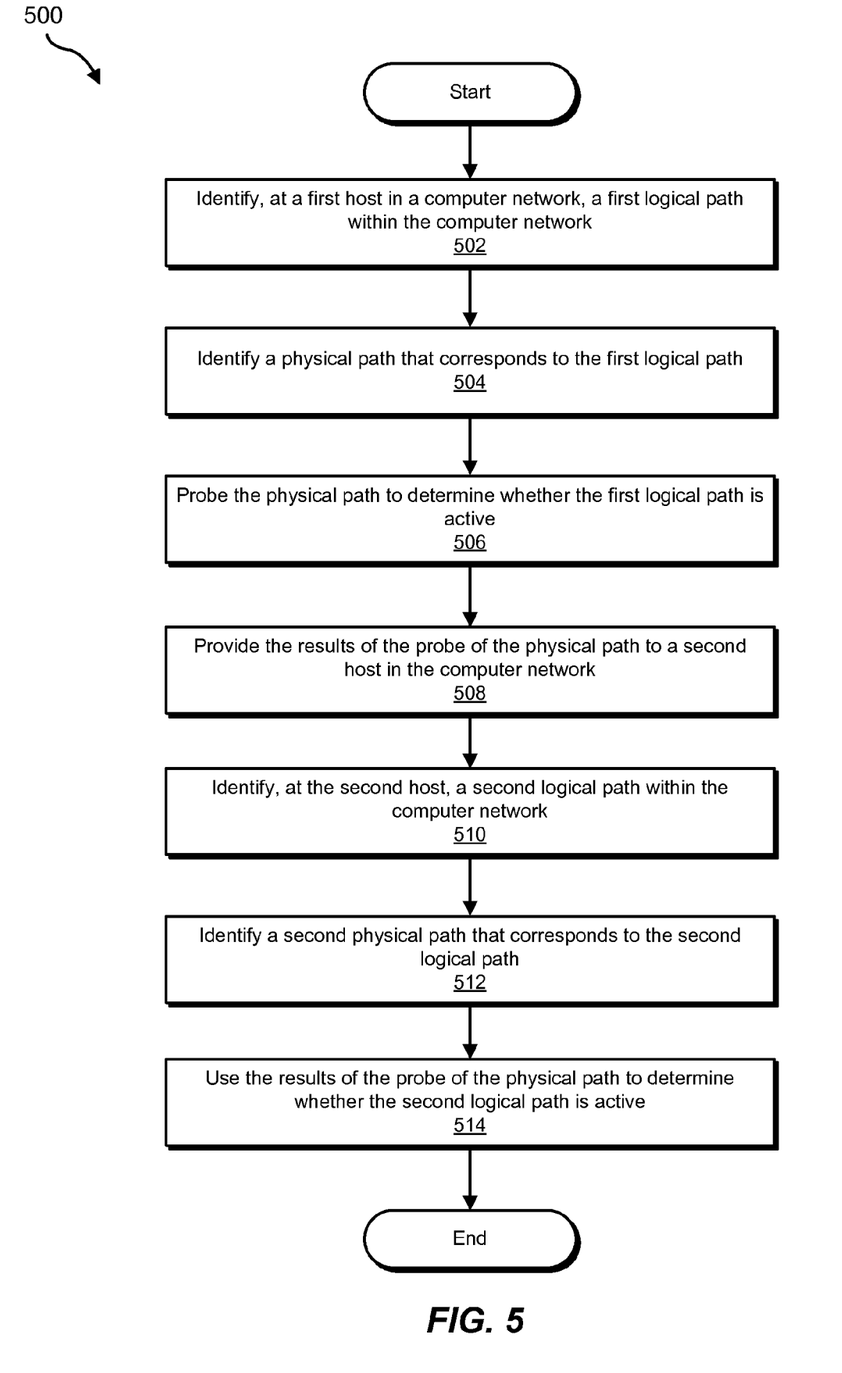
FIG. 5 is a flow diagram of an exemplary method for monitoring physical paths within a computer network according to another embodiment.

FIG. 5 is a flow diagram of exemplary computer-implemented method 500 for monitoring physical paths within a computer network. While exemplary method 400 may incorporate a single-host computer network, exemplary method 500 may incorporate a multiple-host computer network.

At step 502 in FIG. 5, the various systems described herein may identify, at a first host in a computer network, a first logical path. For example, path-identification module 104 may, as part of host 302(1) in computer network 300, identify a first logical path within a computer network. Step 502 may be performed in several ways, including those described above in connection with step 402 of exemplary method 400.

At step 504, the systems described herein may identify a first physical path that corresponds to the first logical path. For example, path-identification module 104 may, as part of host 302(1), identify a first physical path based on the first logical path. In some examples, the first logical path may identify one or more path segments that define the first physical path. Step 504 may be performed in several ways, including those described above in connection with step 404 of exemplary method 400.

At step 506, the systems described herein may probe the first physical path to determine whether the first logical path is active. For example, path-probing module 108 may, as part of host 302(1), probe the first physical path to determine whether the first logical path is active. Path-probing module 108 may determine that the first logical path is active if each communication port in the first physical path is active. Step 506 may be performed in several ways, including those described above in connection with step 406 of exemplary method 400.

At step 508, the systems described herein may provide the results of the probe of the first physical path to a second host in the computer network. For example, path-monitoring module 108 may, as part of host 302(1), transmit at least a portion of the results of the probe of the first physical path to host 302(2). The results of the probe of the first physical path may allow a second host to determine whether a second logical path is active without probing the second physical path. These results may include any data structure, including, for example, a bitmap array, a hash table, or a binary tree.

Step 508 may be performed in a variety of ways. In certain embodiments, path-monitoring module 106 may, as part of the first host, create and/or populate an active-port list that identifies communication ports that are both active and accessible to the first host. The first host may transmit at least a portion of active-port list 124 to a second host that shares access to at least one communication port with the first host. For example, host 302(1) may create an active-port list 124 that identifies communication ports corresponding to path segments 312(1) and 314(1) as active, and host 302(1) may transmit this active-port list 124 to host 302(2), which host 302(2) may share access to at least some of the communication ports corresponding to path segments 312(1) and 314(1).

At step 510, the systems described herein may identify, at a second host within the computer network, a second logical path. For example, path-identification module 104 may, as part of host 302(2), identify a second logical path within the computer network. The second logical path may identify path segments 312(4) and 314(1). Based on path segments 312(4) and 314(1), path-identification module 104 may identify each communication port that corresponds to the second logical path.

At step 512, the systems described herein may identify a second physical path that corresponds to the second logical. For example, path-identification module 104 may, as part of host 302(2), identify path segments 312(4) and 314(1) defining a second physical path. As such, the second physical path may include each communication port that corresponds to path segments 312(4) and 314(1).

Although the first physical path and the second physical path may be different, the first physical path and the second physical path may share access to at least one communication port. For example, path segment 312(1) and path segment 312(4) may share access to a communication port at network switch 304(1). In this example, the first physical path and the second physical path, which may both include path segment 314(1), may also share access to communication ports that correspond to path segment 314(1).

At step 514, the systems described herein may use the results of the probe of the first physical path to determine whether the second logical path is active without probing the second physical path. For example, path-monitoring module 106 may, at the second host, compare each communication port in the second physical path with active-port list 124. If active-port list 124 includes each communication port in the second physical path, path-monitoring module 106 may determine that the second logical path is active without probing the second physical path. However, if active-port list 124 lacks at least one communication port in the second physical path, path-monitoring module 106 may be unable to determine whether the second logical path is active or inactive. Upon completion of step 514 in FIG. 5, exemplary method 500 may terminate.

Although not illustrated in FIG. 5, exemplary method 500 may include one or more additional steps. In certain embodiments, to provide the results of the probe of the physical path to the second host within the computer network, the first host may transmit the results of the probe to a managing host. The managing host may then transmit the results of the probe of the physical path to the second host. For example, host 302(1) may transmit active-port list 124 to managing host 308 in FIG. 3, and managing host 308 may then transmit active-port list 124 to host 302(2).

In some embodiments, one or more hosts in the computer network may be directed by the managing host. For example, managing host 308 may transmit one or more commands to host 302(1) to initiate identifying the first logical path or probing the first physical path. In addition, upon receiving the results of the probe of the first physical path, the managing host may decide to transmit only a portion of the results of the probe of the first physical path to the second host. For example, managing host 308 may decide to transmit only a portion of active-port list 124 to host 302(2) after determining that at least one communication port included in active-port list 124 is inaccessible to host 302(2).

In various embodiments, a third physical path may be probed at a third host in the computer network while the first host simultaneously probes the first physical path. For example, host 302(3) may probe a third physical path through path segments 312(7) and 314(13) while host 302(1) probes the first physical path through path segments 312(1) and 314(1). Managing host 308 may also coordinate and direct hosts 302 to simultaneously probe physical paths that do not include any common communication ports.

By providing network topology information to hosts in a computer network, the various systems and methods described herein may enable such hosts to quickly and accurately identify active and inactive logical paths. As a result, these systems and methods may reduce the amount of time and resources required to perform conventional multipathing techniques.

Figure 6:
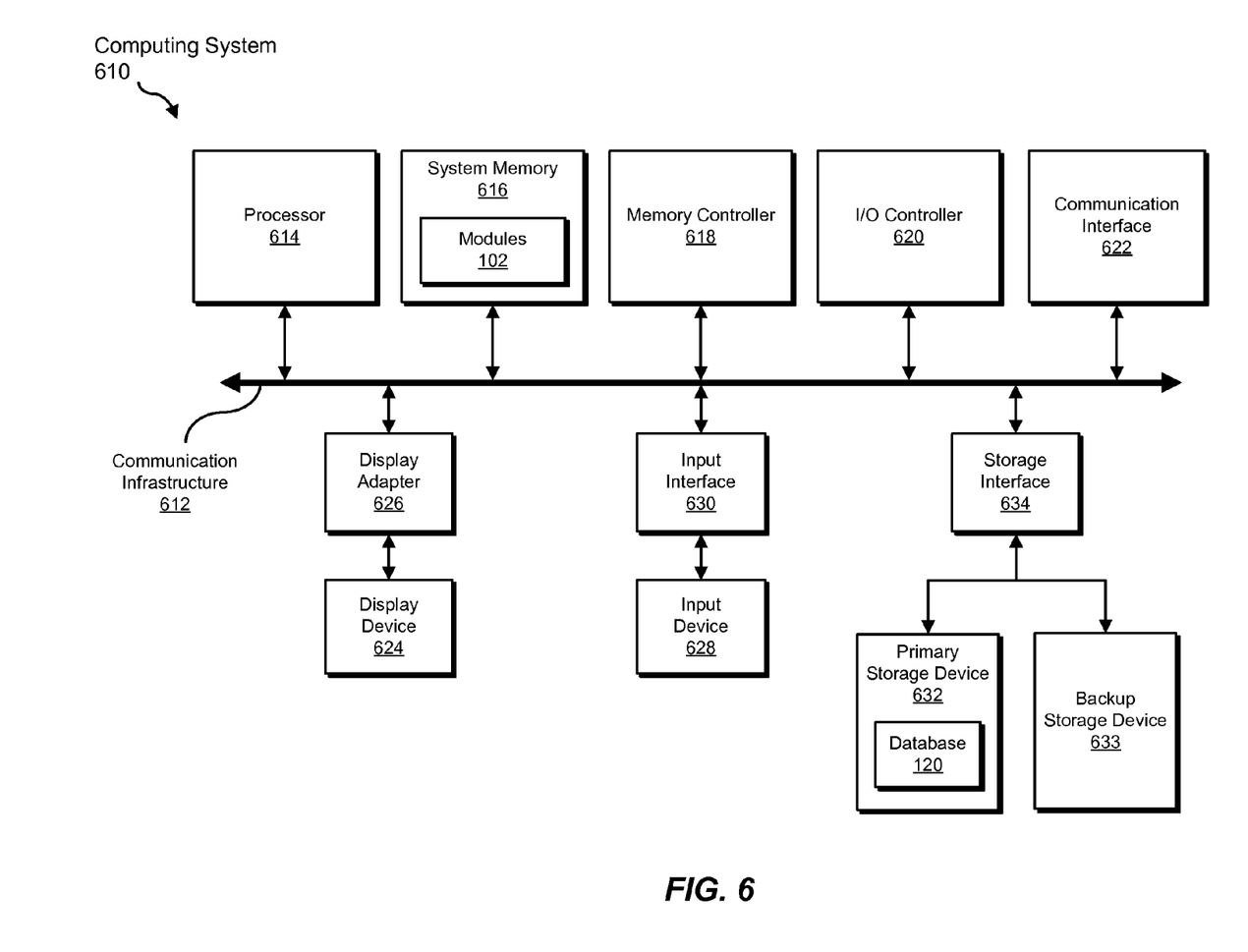
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, probing, determining, using, create, adding, populating, attempting, marking, providing, accessing, and transmitting steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, probing, determining, using, create, adding, populating, attempting, marking, providing, accessing, and transmitting.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, probing, determining, using, create, adding, populating, attempting, marking, providing, accessing, and transmitting steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, probing, determining, using, create, adding, populating, attempting, marking, providing, accessing, and transmitting steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, probing, determining, using, create, adding, populating, attempting, marking, providing, accessing, and transmitting steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, probing, determining, using, create, adding, populating, attempting, marking, providing, accessing, and transmitting steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
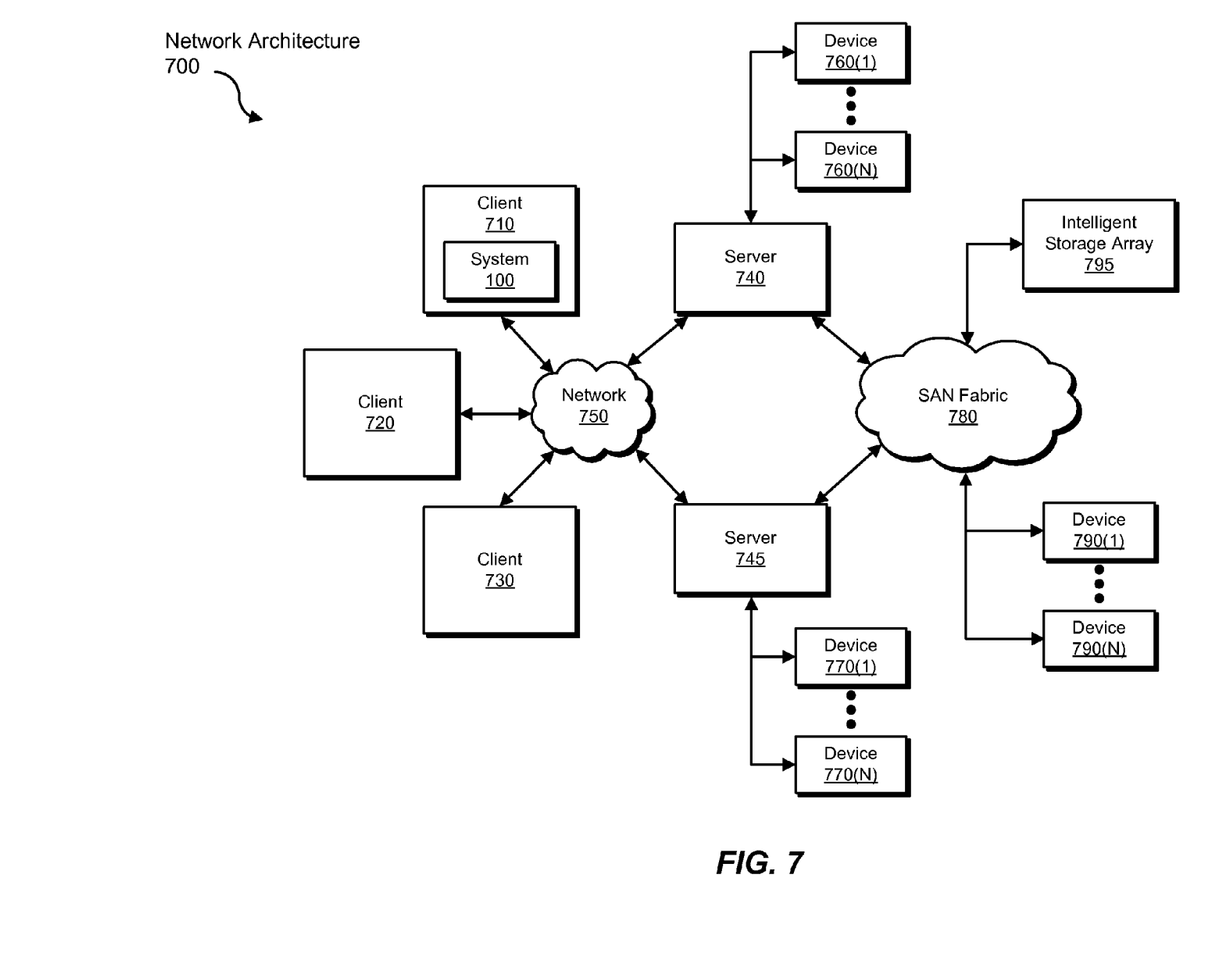
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, probing, determining, using, create, adding, populating, attempting, marking, providing, accessing, and transmitting steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for monitoring physical paths within a computer network.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a property or characteristic by storing and/or modifying data in probed-path list 122 and/or active-port list 124 in FIG. 1.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for monitoring physical paths within a computer network, at least a portion of the method being performed by a host comprising at least one processor, the method comprising:
   identifying a first logical path that comprises a data structure that identifies a physical path within a computer network;
   identifying the physical path that corresponds to the first logical path;
   probing the physical path to determine whether the first logical path is active;
   identifying at least one additional logical path that is different from the first logical path;
   determining that a data structure of the at least one additional logical path identifies the same physical path identified by the data structure of the first logical path;
   using the results of the probe of the physical path to determine whether the at least one additional logical path is active without probing the physical path an additional time;
   providing at least a portion of the results of the probe of the physical path to an additional host within the computer network to enable the additional host to determine whether at least one additional physical path that is different from the physical path is active without actually probing the at least one additional physical path.

2. The method of claim 1, further comprising:
   creating a probed-path list that identifies physical paths within the computer network that have been probed;
   upon probing the physical path, adding the physical path to the probed-path list.

3. The method of claim 2, wherein determining that the data structure of the at least one additional logical path identifies the same physical path identified by the data structure of the first logical path comprises:
   identifying a physical path that corresponds to the at least one additional logical path;

determining that the physical path that corresponds to the at least one additional logical path is identified in the probed-path list.

4. The method of claim 1, further comprising:
creating an active-port list that identifies active communication ports within the computer network;
identifying each communication port in the physical path;
upon determining that the first logical path is active, populating the active-port list with each communication port in the physical path.

5. The method of claim 4, wherein determining that the data structure of the at least one additional logical path identifies the same physical path identified by the data structure of the first logical path comprises:
identifying each communication port in the physical path;
determining that each communication port in the physical path is identified in the active-port list.

6. The method of claim 1, wherein probing the physical path to determine whether the first logical path is active comprises attempting to access a network device through the physical path.

7. The method of claim 6, further comprising at least one of:
marking the first logical path as active after successfully accessing the network device through the physical path;
marking the first logical path as inactive after failing to access the network device through the physical path.

8. The method of claim 1, further comprising at least one of:
marking the at least one additional logical path as active based on the results of the probe of the physical path;
marking the at least one additional logical path as inactive based on the results of the probe of the physical path.

9. The method of claim 1, wherein identifying the physical path that corresponds to the first logical path comprises accessing the data structure of the first logical path to identify each communication port in the physical path.

10. The method of claim 1, wherein each of the data structures comprises at least one of:
a bitmap array;
a hash table;
a binary tree.

11. A computer-implemented method for monitoring physical paths within a computer network, at least a portion of the method being performed by a computing device comprising at least one processor, the method comprising:
at a first host in a computer network:
identifying a first logical path that comprises a data structure that identifies a first physical path within the computer network;
identifying the first physical path that corresponds to the first logical path;
probing the first physical path to determine whether the first logical path is active;
providing at least a portion of the results of the probe of the first physical path to a second host in the computer network;
at the second host:
identifying at least one additional physical path that is different from the first physical path;
determining that a data structure of the at least one additional physical path identifies at least a portion of the same physical path identified by the data structure of the first logical path;
using the results of the probe of the first physical path to determine whether the at least one additional physical path is active without actually probing the at least one additional physical path.

12. The method of claim 11, wherein providing the results of the probe of the first physical path to the second host comprises:
transmitting the results of the probe of the first physical path from the first host to a managing host in the computer network;
transmitting the results of the probe of the first physical path from the managing host to the second host.

13. The method of claim 11, further comprising:
creating an active-port list that identifies active communication ports within the computer network;
identifying each communication port in the first physical path;
upon determining that the first logical path is active, populating the active-port list with each communication port in the first physical path.

14. The method of claim 13, wherein providing the results of the probe of the first physical path to the second host further comprises transmitting at least a portion of the active-port list to the second host.

15. The method of claim 14, wherein determining whether the at least one additional physical path is active comprises:
identifying each communication port in the at least one additional physical path;
determining that each communication port in the at least one additional physical path is identified in the portion of the active-port list transmitted to the second host.

16. The method of claim 11, wherein probing the first physical path to determine whether the first logical path is active comprises attempting to access a network device through the first physical path.

17. The method of claim 11, wherein identifying the first physical path that corresponds to the first logical path comprises accessing the data structure of the first logical path to identify each communication port in the first physical path.

18. The method of claim 11, wherein the data structure comprises at least one of:
a bitmap array;
a hash table;
a binary tree.

19. The method of claim 11, further comprising, at a third host, probing a third physical path within the computer network while the first host is simultaneously probing the first physical path.

20. A system for monitoring physical paths within a computer network, the system comprising:
a path-identification module programmed to:
identify a first logical path that comprises a data structure that identifies a physical path within a computer network;
identify the physical path that corresponds to the first logical path;
identify at least one additional logical path that is different from the first logical path;
determine that a data structure of the at least one additional logical path identifies the same physical path identified by the data structure of the first logical path;
a path-probing module programmed to probe the physical path to determine whether the first logical path is active;

a path-monitoring module programmed to:
- use the results of the probe of the physical path to determine whether the at least one additional logical path is active without probing the physical path an additional time;
- provide at least a portion of the results of the probe of the physical path to an additional host within the computer network to enable the additional host to determine whether at least one additional physical path that is different from the physical path is active without actually probing the at least one additional physical path;

at least one processor configured to execute at least one of the path-identification module, the path-probing module, and the path-monitoring module.

* * * * *